3,297,667
PRODUCTION OF CIS-1,4-POLYDIENES BY POLYMERIZATION OF 1,3-DIENES
Werner C. von Dohlen and Thomas P. Wilson, Charleston, and Edward G. Caflisch, South Charleston, W. Va., assignors to Union Carbide Corporation, a corporation of New York
No Drawing. Filed Feb. 28, 1963, Ser. No. 261,875
15 Claims. (Cl. 260—82.1)

This invention relates to novel polymerization catalyst compositions and to a process for polymerizing diolefins therewith. More particularly, this invention relates to the stereospecific polymerization of 1,3-dienes, such as butadiene-1,3 and isoprene, to high molecular weight homopolymers and copolymers having a high content of cis-1,4 structure.

The catalytically promoted polymerization of diolefins is well known to the art. Many catalysts that have been proposed for the polymerization of 1,3-dienes are catalysts of the Ziegler-type, based on metals of the first transition series. Others are alkali metal catalysts such as the butyllithium catalyst which produces predominantly cis-1,4-polyisoprene but is not specific for the production of cis-1,4-polybutadiene. Commonly, the prior art catalysts have resulted in the production of mixtures of the stereoisomeric forms of the polydienes, that is, of mixtures of cis-1,4, trans-1,4,- and 1,2-polydienes and have not been capable of producing polymers containing a high proportion of the desirable cis-1,4 stereoisomer which is particularly useful as an extender or substitute for natural rubber.

It is an object of this invention to provide a process for polymerizing 1,3-dienes to high molecular weight polymers.

Another object of this invention is to provide a process for polymerizing 1,3-dienes to high molecular weight polymers having a high content of cis-1,4 structure.

Another object of this invention is to provide a polymerization process, which can be conducted in bulk or in hydrocarbon solvents, for producing from 1,3-diene monomers polydienes which are rich in cis-1,4 linkages.

A further object of this invention is to provide a process for producing homopolymers and copolymers of isoprene and butadiene-1,3 which have a high cis-1,4 content.

A still further object of this invention is to provide novel polymerization catalyst compositions which have high stereoselectivity for the production of cis-1,4-polydienes.

Other objects and features of the invention will be made apparent by the following description and appended claims.

This invention results from the discovery that 1,3-dienes can be polymerized to produce high molecular weight polymers having a high proportion of cis-1,4 structure by contacting them with a catalyst composition containing four essential components. The four components which must be present in the novel catalyst compositions of this invention are: (1) an ion of a Group III–B metal in trivalent state, (2) a bidentate organic ligand, (3) a halide ion and (4) an aluminum trialkyl or alkylaluminum hydride. These catalyst compositions have been found to be capable of promoting the polymerization of 1,3-dienes at an effective rate to form polydienes usually containing more than about 90 percent cis-1,4 linkages. Polymerization of the 1,3-dienes can be carried out in bulk or in a suitable hydrocarbon solvent; the sole essential requirement being that a catalytic amount of the catalyst composition, sufficient to cause polymerization of the diene, be present in the reaction mixture. Not only is polymerization of diene monomers to form homopolymers readily accomplished with the catalyst compositions of this invention, but copolymers such as, for example, copolymers of butadiene-1,3 and isoprene can also be produced.

The exact nature of the catalyst compositions of the present invention and of the active sites involved in catalysis of the polymerization reaction is not known at this time; however, the exact structure of the catalyst is not of importance. According to present stereospecific polymerization theories, the active sites serve to hold the monomer molecules in position so that they are added to the polymer chain in a stereoregular manner; however, applicants do not intend to be bound by any theoretical explanations for the reaction.

Components (1) and (2) of the catalyst composition, that is, the trivalent metal ion and the organic moiety, are constituents of certain members of a broad class of complex compounds known as metal chelates and are incorporated into the catalyst system through use of such compounds. The chelates of the metals having an atomic number of 21 to 71 and occurring within Group III–B of the Periodic Table of the elements are useful in the catalyst compositions of this invention; with the preferred metals being those of the lanthanide series and, in particular, lanthanum and cerium. The term "Group III–B of the Periodic Table" as employed herein refers to Group III–B as given in the standard form of the Periodic Table on pages 56 and 57 in Lange's Handbook of Chemistry, Eighth Edition, Handbook Publishers, Inc. (1952). Metal chelates which are of particular utility in this invention are chelates of the trivalent forms of the above-described Group III–B metals wherein the organic ligands are either monovalent and bidentate or divalent and bidentate. By the term "metal chelate" as used herein is meant a coordination compound having one or more ring structures and formed from a metal and a substance containing two or more electron doners. By the term "ligand" as used herein is meant an ion or molecule which is bound to and considered bonded to a metal atom or ion. A "bidentate ligand" is one having two donor or functional atoms or groups and thus having two positions through which covalent or coordinate covalent bonds with the metal may be formed.

The four essential components of the catalyst composition, that is, the trivalent Group III–B metal ion, the bidentate organic ligand, the halide ion, and the aluminum trialkyl or alkylaluminum hydride, can be introduced into the catalyst system in any of a number of ways. Thus, the catalyst composition can be prepared by combining a metal chelato halide, $ML_2X$ or $MLX_2$ or mixtures thereof, with an aluminum trialkyl or alkylaluminum hydride. (M represents a trivalent Group III–B metal ion, I represents a suitable organic ligand and X represents a halide ion.) Alternatively, the catalyst composition can be prepared by admixing in a suitable solvent (1) a soluble metal chelate, $ML_3$, (2) an alkylaluminum halide, and (3) an aluminum trialkyl or alkylaluminum hydride.

The metal chelates employed in this invention are readily prepared by methods known to those skilled in the art; thus, the metal chelates can be prepared by contacting amalgamated metal with a suitable chelating agent in an organic solvent from which the metal chelate can be recovered by evaporation of the solvent. For example, in a preferred procedure, the suitable Group III–B metal is first treated to remove any inert oxide coating from its surface by immersion in fused mercuric chloride, the amalgam coated metal is washed with ethanol and with benzene and then placed in a flask containing a mixture of benzene and suitable chelating agent, the mixture is refluxed for a period of up to several days, the benzene is distilled off under vacuum, and the solid metal chelate product is recovered.

Suitable chelating agents for preparing the metal chelates employed in this invention are organic compounds providing bidentate ligands which possess certain functional groups, that is, radicals or atoms capable of bonding to the metal to form the chelate ring. The functional groups that are suitable include tertiary nitrogen (—N=), formyl

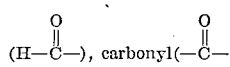

oxy (—O—), alkoxy[R—O—) where R is alkyl]

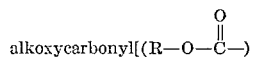

where R is alkyl], amino($H_2N$—), alkimino[(=N—R) where R is alkyl], and hydroxyl (HO—).

Among chelating agents of the type described which form the desired metal chelates are o-hydroxyaldehydes such as salicylaldehyde, 2-hydroxy-1-naphthaldehyde, 2-hydroxy-3-naphthaldehyde, and the like; o-hydroxyphenones such as 2'-hydroxy-butyrophenone, 2'-hydroxyacetophenone, 2'-hydroxypropiophenone, and the like; aminophenols such as o-aminophenol, N-methyl o-aminophenol, N-ethyl o-aminophenol, and the like; hydroxy esters such as ethyl salicylate, propyl salicylate, butyl salicylate, and the like; phenolic compounds such as 2-hydroxyquinoline, 8-hydroxyquinoline, and the like; β-diketones such as acetylacetone, benzoylacetone, propionylacetone, isobutyrylacetone, valerylacetone, ethylacetylacetone, and the like; monocarboxylic acids such as acetic acid, propionic acid, valeric acid, hexanoic acid, 2-ethylhexanoic acid, lauric acid, stearic acid, and the like; ortho dihydric penols such as pyrocatechol; alkylene glycols such as ethylene glycol, propylene glycol, trimethylene glycol, tetramethylene glycol, and the like; dicarboxylic acids such as oxalic acid, malonic acid, maleic acid, succinic acid, o-phthalic acid and the like; alkylated derivatives of the above-described dicarboxylic acids; phenolic ethers such as o-hydroxyanisole, o-hydroxyethyl phenyl ether, and the like; salicylaldimines having the general formula:

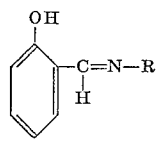

wherein R represents an alkyl group; and the like. Also suitable as chelating agents are any of the above-described aromatic compounds further substituted with one or more electron donor groups such as an alkyl group, a cycloalkyl group, an alkoxy group, and the like; but preferably free of substituents which are strongly electron withdrawing such as a nitro group. Illustrative of such compounds one can mention 5-methylsalicylaldehyde, 5-cyclohexyl salicylaldehyde, 4-methoxy salicylaldehyde, 4-methyl-8-hydroxyquinoline, and the like.

In order for chelation to occur the ligand must not be excessively bulky; useful ligands being those containing not more than about 20 carbon atoms. Furthermore, the two functional groups of the bidentate ligand must not be too widely separated. Both functional groups can be attached to the same carbon atom but they can not be separated by more than about 5 carbon atoms. The bidentate ligand and the Group III–B metal ion thus form a chelate ring which can be from four to eight-membered including the metal ion; for example when a monocarboxylic acid is employed as chelating agent the resulting chelate ring is four-membered while with salicylaldehyde as chelating agent the resulting chelate ring is six-membered.

The third essential component of the catalyst composition is a halide ion. One method of introducing the halide ion into the catalyst system, as heretofore pointed out, is to use a suitable metal chelato halide compound as a starting material in preparing the catalyst. Obviously, the metal chelato halide compound can be a compound of any of the Group III–B metals heretofore described; as for example a mixed chelato chloride of cerium or a mixed chelato bromide of lanthanum. Typical of the chelato halide compounds of utility in the catalyst compositions of this invention one can mention the mixed chelato chlorides of cerium such as cerous salicylaldehydo chloride, cerous t-butylsalicylaldehydo chloride, cerous t-butylsalicylaldehydo dichloride, Ce, (cyclohexylsalicylaldehydo)chloride, and the like. Such Group III–B metal chelato halides can be prepared by reacting the Group III–B metal halides with the previously described chelating agents; for example, by reacting cerous chloride with 5-cyclohexylsalicylaldehyde or with 8-hydroxyquinoline or with o-aminophenol.

Instead of introducing the halide into the catalyst system in the form of a Group III–B metal chelato halide compound, as described above, it can be introduced as an alkylaluminum halide. The alkylaluminum halides which can be used are the dialkylaluminum halides and the monoalkylaluminum dihalides wherein the alkyl group has from 1 to about 15 carbon atoms. Illustrative of the alkylaluminum halides which can be used are dimethylaluminum chloride, diisobutylaluminum bromide, dihexylaluminum chloride, dioctylaluminum iodide, didodecylaluminum fluoride, dipentadecylaluminum chloride, monoethylaluminum dibromide, monoisobutylaluminum dichloride, monohexylaluminum diiodide, monooctylaluminum dichloride, monopentadecylaluminum dichloride, and the like.

The fourth essential component of the catalyst compositions of this invention is an aluminum trialkyl or alkylaluminum hydride; that is, an alkylaluminum compound having the general formula:

$$R_{3-n}AlH_n$$

wherein R is an alkyl group having from 1 to about 15 carbon atoms, preferably from 2 to about 8 carbon atoms, and $n$ has a value of 0, 1 or 2. These compounds are the aluminum trialkyls, the dialkylaluminum hydrides and the monoalkylaluminum dihydrides. Illustrative of such compounds one can mention trimethylaluminum, triethylaluminum, triisobutylaluminum, trihexylaluminum, trioctylaluminum, tridodecylaluminum, dimethyl aluminum hydride, diisobutylaluminum hydride, dihexylaluminum hydride, monoethylaluminum dihydride, monobutylaluminum dihydride, monooctylaluminum dihydride and the like.

The polymerization catalyst compositions of this invention can be prepared by contacting a suitable metal chelato halide compound, as hereinbefore described, with an aluminum trialkyl or alkylaluminum hydride for a period of about 0.03 to about 72 hours at a temperature of about 0° C. to about 100° C., preferably for about 1 to about 8 hours at a temperature of about 25° C. A preferred procedure, when the metal chelate employed is soluble in organic solvents, is to prepare the catalyst composition by first contacting the metal chelate with an alkylaluminum halide in a suitable inert organic solvent, such as hexane, cyclopentane, benzene, ethanol, and the like; then treating the solution with an aluminum trialkyl or alkylaluminum hydride and, finally, allowing the resulting admixture to stand for a period of at least about 0.25 hours at a temperature of about 20° C. to about 60° C.

Where the metal chelate employed is insoluble in inert organic solvents, as for example oxalates of the Group III–B metals, then the catalyst composition can be produced by first preparing the metal chelate halide in an active form and then reacting it with the aluminum trialkyl or alkylaluminum hydride compound. Illustrative of catalysts prepared in this manner is the catalyst composition formed by reaction of an active cerous halide oxalate component with an aluminum trialkyl or alkylaluminum hydride. The cerous halide oxalate can be prepared by any of a variety of methods; for example, cerous chloride oxalate can be prepared by the reaction of cerous oxalate with concentrated hydrochloric acid at elevated temperature, by the reaction of cerous chloride with mixed oxalates produced by heating oxalic acid and diethyl oxalate, or by the reaction of oxalic acid with $H_2CeCl_6$.

The cerous halide oxalate can be prepared in active form by admixing the starting materials in a suitable flask, carrying out the reaction at autogenous temperature or preferably at elevated temperature to form a cerous halide oxalate precipitate and then evaporating to complete dryness by subjecting the flask to a temperature of at least about 250° C. Alternatively, the cerous halide oxalate percipitate can be recovered from the hot reaction mixture by filtering, dried, and then subjecting to a heat treatment at temperatures from about 250° C. to about 360° C. for a period of from about 10 to about 60 minutes, preferably at a temperature of at least about 300° C. for at least about 45 minutes. Heat treatment of the cerous halide oxalate, as described above, is essential to provide an active material which will yield an effective polymerization catalyst when combined with the suitable aluminum trialkyl or alkylaluminum hydride compound.

A polymerization catalyst composition can be prepared by contacting the active cerous halide oxalate and the aluminum trialkyl or alkylaluminum hydride in any suitable manner. A preferred procedure is to contact the cerous halide oxalate with excess aluminum trialkyl or alkylaluminum hydride, allow the admixture to stand for several hours at room temperature, and then remove the excess aluminum trialkyl or alkylaluminum hydride before employing the catalyst to polymerize the diene.

The proportions of the components of the polymerization catalyst compositions of this invention can be varied widely. The molar ratio of halide to Group III–B metal ion can be from about 0.1:1 to about 10:1; more suitably from about 0.5:1 to about 2.5:1, and preferably about 1:1. The molar ratio of aluminum to Group III–B metal ion in the catalyst composition can be varied from about 1:1 or less to about 400:1 or more. To some extent, the amount of aluminum trialkyl or alkylaluminum hydride required is dependent on whether or not the reaction system is free of impurities, with impurity-free systems requiring smaller amounts. However, at ratios of aluminum to Group III–B metal ion of less than about 1:1, the catalyst composition has been found to be generally inactive. Beyond aluminum to Group III–B metal ion ratios of 50:1, the rate of polymerization of the monomer tends to drop off slightly while beyond ratios of 100:1 there is a tendency for the stereospecificity of the catalyst to drop somewhat. The preferred range of the molar ratio of aluminum to Group III–B metal ion in the catalyst composition is from about 25:1 to about 100:1.

Polymerization of the 1,3-diene can be carried out by conventional bulk polymerization procedures, that is, with only the liquid monomer and the catalyst present in the reaction system, or by solution polymerization employing suitable organic solvents. Among the organic solvents which are suitable are the saturated aliphatic compounds such as pentane, hexane, heptane, isooctane, kerosene, and the like; the cycloaliphatics such as cyclopentane, cyclohexane, methylcyclopentane, dimethylcyclopentane, and the like; and aromatic solvents such as benzene, toluene, xylene, and the like. In general, bulk polymerization is preferable to solution polymerization because of the tendency of organic solvents to produce a swollen, agglomerated polymer and to reduce the polymerization rate. The above-described aromatic solvents tend to alter the polymerization reaction by participation and thereby change the polymerization rate and molecular weight of the polymer; such solvents can thus be used to give some degree of control over the molecular weight of the polymer if desired.

Polymerization of 1,3-dienes with the catalyst compositions of this invention can be carried out under autogenous pressure at temperatures from —80° C. or less, to 100° C. or more, more suitably at a temperature from about —10° C. to about 70° C., and preferably at a temperature from about 0° C. to about 40° C. The polymerization reaction is suitably carried out under autogenous pressure; but the reaction system can be further pressurized if desired, for example, by addition of an inert gas diluent. The amount of catalyst charged to the reaction system can be varied over a wide range; the sole essential requirement being that a catalytic amount of the catalyst composition, sufficient to cause polymerization of the 1,3-diene, be present in the reaction system. Low concentrations of catalyst are desirable in order to minimize ash problems, but higher concentrations provide improved polymerization rates. Suitable concentrations of catalyst are, in general, amounts providing from about 0.02 millimoles to about 1.0 millimoles of Group III–B metal per 100 milliliters of liquid diene monomer, the optimum quantity being dependent on the desired polymerization rate and on the purity of the monomer. Productivities of up to about 95 grams of polymer per gram of catalyst and polymerization rates of up to about 260 grams of polymer per gram of catalyst per hour have been obtained with the catalyst compositions of this invention.

The purity of the 1,3-diene monomer employed in preparing the polydienes of this invention can vary somewhat, with commercially available monomers being suitable; the only essential requirement is that the monomer be free of impurities which would inactivate the catalyst. Preferably, monomer of high purity is employed, thereby minimizing the amount of aluminum trialkyl or alkylaluminum hydride required.

The 1,3-dienes that can be polymerized by the catalyst compositions of the invention are compounds having the general formula:

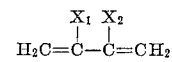

wherein $X_1$ and $X_2$ are independently selected from the group consisting of hydrogen and alkyl having from 1 to about 10 carbon atoms. Illustrative of suitable 1,3-dienes, one can mention butadiene-1,3, isoprene, 2,3-dimethyl-1,3-butadiene, 2-ethyl-1,3-butadiene, 2-hexyl-1,3-butadiene, 2,3-dibutyl-1,3-butadiene, 2-hexyl-1,3-butadiene, 2-decyl-1,3-butadiene, and the like.

As hereinbefore indicated, the catalyst compositions of this invention are of particular utility in preparation of homopolymers or copolymers of butadiene-1,3 and isoprene; said homopolymers and copolymers containing a high proportion of cis-1,4 structure. By the term "high proportion" is meant a content of cis-1,4-polydiene of about 90 percent or higher. It has been found that equivalent polymerization rates are usually attained in the homopolymerization of butadiene-1,3 or isoprene and also that in the copolymerization of butadiene-1,3 and isoprene the amount of each monomer incorporated into the copolymer is directly proportional to the amount of the monomer present in the polymerization mixture.

Molecular weights of the cis-1,4-polydienes produced by the processes of this invention were calculated by known methods from the intrinsic viscosity of the polydiene in toluene and ranged from about $0.2 \times 10^6$ to about $1.5 \times 10^6$. By comparison, natural rubber or hevea has by the same method a molecular weight of $1.0 \times 10^6$ to $1.5 \times 10^6$. The polymer compositions were determined in the conventional manner from infrared spectra of thin films of the polydiene. Polyisoprenes produced by the process of this invention are very like natural rubber in structure, as is evident from the infrared spectra of these polymers. The microstructure consists predominantly of cis-1,4 linkages with some 3,4-polyisoprene linkages in evidence. The 3,4-polyisoprene content is somewhat higher than in natural rubber but somewhat less than that in polyisoprene produced by use of the prior art butyllithium catalyst.

The following examples are given to illustrate the invention, it being understood that these examples are not intended to be limiting.

Example 1

There were added to a clean, dry polymerization tube, 2 ml. of triisobutylaluminum and 0.1 g. of cerium salicylaldehyde dichloride and the mixture was allowed to stand at 20–25° C. for 23 hours. The polymerization tube was then cooled in Dry Ice, about 25 ml. of liquid butadiene-1,3 was added and the tube was sealed and removed from the Dry Ice bath. In 15 minutes the tube had become hot to the touch and the contents too solid to pour. The reaction was quenched by cooling the polymerization tube in Dry Ice and the polymer was washed in isopropanol and hydrochloric acid and then dried. The recovery of rubbery polymer was 8.76 g. and it had a viscometrically determined molecular weight of about $0.25 \times 10^6$. The infrared spectrum indicated a content of 93 percent cis-1,4-polybutadiene, 3 percent trans-1,4-polybutadiene and 4 percent 1,2-polybutadiene. This experiment demonstrates the effectiveness of the catalyst compositions of this invention in producing cis-1,4-polybutadiene.

In contrast, an experiment in which a chelate of the Group III–B metal was not employed produced very little polybutadiene. In this experiment a quantity of cerous chloride weighing 0.05 g. was introduced into a polymerization tube, 1 ml. of triisobutylaluminum was added and the tube was sealed and allowed to stand for two hours at room temperature. After this period, 25 ml. of butadiene-1,3 was charged, the tube was again sealed, shaken, and allowed to stand at room temperature for 13 days. A very small amount of polymer formed and was isolated. Its weight was about 0.1 g. and an infrared spectrum indicated its composition to be about 79 percent cis-1,4-polybutadiene, 14 percent trans-1,4-polybutadiene and 7 percent 1,2-polybutadiene. This experiment shows that in the absence of the bidentate organic moiety little polymer is produced and the stereoselectivity of the catalyst complex is diminished.

The fact that similar poor results occur if the halide ion is omitted from the catalyst complex is indicated by the following experiment in which tris salicylaldehydo cerium, a light yellow solid, was prepared by dissolving cerium metal in refluxing salicylaldehyde. A mixture consisting of 0.0351 g. of the tris salicylaldehydo cerium and 1 ml. of triisobutylaluminum was allowed to stand in a sealed tube at room temperature for about one hour. About 25 ml. of butadiene were then added to the reaction tube at Dry Ice temperature and the tube was resealed and warmed to room temperature. After about 66 hours at room temperature the reaction product was discharged, coagulated, washed and dried. About 1.8 g. of polybutadiene was collected and this analyzed as 56 percent of cis-1,4-form, 29 percent trans-1,4-form and 15 percent 1,2-form, by infrared analysis.

Example 2

Tris salicylaldehydo cerium, 0.250 g., and cerous chloride, 0.270 g., were mixed together and the mixture was dissolved in 40 g. of ethanol and refluxed for about 24 hours. A solid product, a mixed salicylaldehydo cerium chloride, was formed and this material was removed from the ethanol and carefully dried. A catalyst composition consisting of 0.020 g. of the mixed salicylaldehydo cerium chloride and 0.5 ml. of triisobutylaluminum was placed in a polymerization tube and kept at about 25° C. for 2 hours. Then 25 ml. of liquid butadiene-1,3 was added at −78° C. The tube was kept at a temperature of 20 to 25° C. for three days. During this time interval 1.2 g. of rubbery polymer was produced. The polymer was predominantly cis-1,4-polybutadiene, the infrared spectrum indicating a content of 95 percent cis-1,4 linkages, with about equal amounts of trans-1,4 and 1,2-isomers present.

In a similar manner, cis-1,4-polybutadiene is produced by substituting cerous bromide for the cerous chloride.

Example 3

A mixture of 1 ml. of triisobutyl aluminum and 0.0663 g. of a co-catalyst consisting of the reaction product of t-butylsalicylaldehyde and cerous chloride and having the approximate composition $Ce(t\text{-butylsalicylaldehyde})Cl_2$ was allowed to stand for about 16 hours at 25° C. in a sealed tube. At the end of this period about 24 g. of polymerization grade isoprene was charged at Dry Ice temperature and the tube was resealed. The tube and its contents were warmed to room temperature and allowed to stand, with intermittent shaking, for 25 minutes. The isoprene became extremely viscous and finally lost all mobility. The autogenous temperature of the system rose to about 50° C. during this period. The tube was then quenched in Dry Ice and its contents were discharged into an alcohol-HCl mixture, washed and dried. Polyisoprene amounting to 12.0 grams and having a molecular weight of $0.19 \times 10^6$ was recovered. The polymer had an infrared spectrum very similar to that of natural rubber. It consisted of at least 92 percent cis-1,4-polyisoprene with a small amount of the 3,4 isomer. This experiment demonstrates the effectiveness of the catalyst compositions of this invention in the production of cis-1,4-polyisoprene.

In contrast, the experiments below show the inability of catalyst compositions lacking in either the bidentate organic moiety or the halogen to act as effective stereospecific catalysts for cis-1,4-polyisoprene.

A mixture of cerous chloride (0.05 g.), which had been dried by azeotropically removing the water with carbon tetrachloride, and 1 ml. of triisobutylaluminum was permitted to stand for 21 hours at 25° C. in a sealed polymerization tube. Then 25 ml. of polymerization grade isoprene was added and the tube was resealed, shaken, and allowed to stand at room temperature for 13 days. A small amount of polymer, weighing about 0.1 g. when washed and dried, was isolated. An infrared spectrum of this material showed weak absorption bands characteristic of cis-1,4-polyisoprene and 3,4-polyisoprene.

A catalyst composition consisting of 0.02 g. of tris-salicylaldehydo cerium and 1.0 ml. of triisobutylaluminum was permitted to stand at 20–25° C. in a polymerization tube for 2 hours and then 25 ml. of polymerization grade isoprene was added to the polymerization tube. After 11 days at room temperature the liquid in the tube was somewhat viscous and a small amount of polymer was isolated. The total weight of dried polymer was of the order of 0.1 g. and an infrared spectrum of this polymer showed weak absorption bands characteristic of cis-1,4-polyisoprene and 3,4-polyisoprene.

Example 4

A catalyst complex was produced by treating 0.0825 g. of the co-catalyst, cerous 5-cyclohexylsalicylaldehyde chloride, prepared by the reaction between cerous chloride and 5-cyclohexylsalicylaldehyde, with 4 ml. of benzene solution containing about 0.8 ml. of triisobutyl aluminum. Some, but not all, of the co-catalyst dissolved on standing about 16–18 hours. Two ml. of the clear supernatant liquid was then withdrawn and added to the 25 ml. of butadiene-1,3 in a polymerization tube, the tube was sealed and warmed to room temperature. The polymerization reaction proceeded homogenously, the only signs of reaction being an increase in the viscosity of the solution and an increase in the temperature. In about 40 minutes the viscosity was so high that no more flow occurred; while after about two hours the reaction had apparently ceased since no more heat was being evolved. When the reaction tube was opened after about 4 hours, 5.9 g. of polymer was isolated. The polymer analyzed by infrared as 92 percent cis 1,4-polybutadiene, 5 percent trans-1,4-polybutadiene and 3 percent 1,2-polybutadiene.

In a similar manner cis-1,4-polybutadiene is produced by substituting pyrocatechol for the 5-cyclohexylsalicylaldehyde.

Example 5

A catalyst complex of 0.02 g. of a cerous t-butyl salicylaldehyde chloride co-catalyst and 0.5 ml. of diisobutyl aluminum hydride was permitted to stand at room temperature in a polymerization tube for 16 hours. Twenty-five ml. of butadiene-1,3 was then added and the mixture was shaken periodically while being maintained at about 25° C. At the end of 6 hours the reaction was quenched by cooling the tube in Dry Ice and 12.5 g. of rubbery polymer was isolated. The composition of the polymer, by infrared analysis, was 90 percent cis-1,4-polybutadiene, 6 percent trans-1,4-polybutadiene and 4 percent 1,2-polybutadiene.

Example 6

A catalyst complex of 0.02 g. of a cerous t-butyl salicylaldehyde chloride co-catalyst and 0.5 ml. of trihexylaluminum was permitted to stand at 20–25° C. for 16 hours. Then 25 ml. of butadiene-1,3 was added to the catalyst complex and the mixture was agitated at room temperature for six hours. At the end of this period the reaction was quenched and 14.4 g. of rubbery polymer analyzing 92 percent cis-1,4-polybutadiene, 5 percent trans-1,4-polybutadiene and 3 percent 1,2-polybutadiene was isolated.

Example 7

A catalyst complex of 0.02 g. of cerous salicylaldehyde chloride and 0.5 ml. of tridodecylaluminum was allowed to stand for about 16 hours at 20–25° C. in a sealed polymerization tube. The tube was then opened, charged with 25 ml. of butadiene-1,3, resealed, and shaken at a temperature of about 25° C. for six hours. At the end of this time 2.03 g. of rubbery polybutadiene, which analyzed 95 percent cis-1,4 form, 3 percent trans-1,4 form and 2 percent 1,2-form by infrared techniques, was recovered.

Example 8

A catalyst complex, prepared by allowing 0.0201 g. of cerous (t-butylsalicylaldehyde) dichloride and about 0.24 g. of triisobutyl aluminum to stand at 20–25° C. for one hour, was mixed with about 25 ml. of butadiene-1,3 at Dry Ice temperature in a capped tube. Polymer formation began as soon as the temperature had increased to about 0° C. After 3 hours at ambient temperature the reaction product was discharged into an isopropyl alcohol-hydrochloric acid solution, filtered, washed with alcohol, then dried and weighed. The yield was 4.40 g. of a rubbery polymer having a molecular weight, determined viscometrically, of about one million. The polymer had about 92 percent cis-1,4 linkages, 2 percent trans-1,4 linkages and 6 percent 1,2 linkages as determined by infrared analysis.

Example 9

Three polymerization tubes were each charged with a catalyst complex produced from 0.03 g. of Ce(t-butylsalicylaldehyde)Cl$_2$ and 0.5 ml. of triisobutylaluminum. To each tube there was added, at −78° C., 15 ml. of isoprene and 15 ml. of butadiene-1,3. The three tubes were brought to about 15° C. and then the contents were allowed to polymerize at autogenous temperature for one hour. At the end of this period the polymer was coagulated in alcohol-acid solution, washed and dried. The combined weight of dried polymer recovered was 25.8 g. The molecular weight of the polymer was viscometrically determined to be about $0.5 \times 10^6$. The polymer, according to the infrared spectrum contained both cis-1,4-polyisoprene and cis-1,4-polybutadiene. The content of butadiene and isoprene linkages in such copolymers has been found to be directly proportional to the amount of each monomer present in the starting mixture; so that in this run the polymer was composed of approximately 50 percent polybutadiene and 50 percent polyisoprene.

Example 10

A mixture of 5 ml. of triisobutyl aluminum and 0.200 g. of cerous (t-butylsalicylaldehyde) dichloride was allowed to stand at 20–25° C. in a stainless steel bomb for about 18 hours. Then 50 ml. of heptane solvent and 40 ml. each of liquid isoprene and liquid butadiene were introduced into the bomb at Dry Ice temperature. The bomb was sealed, quickly warmed to about 19° C., and thereafter the temperature generated by the heat of reaction was followed by means of an internal thermocouple. The temperature rose for about 1½ hours to a maximum of about 74° C. and then began to fall. After 3 hours the temperature was down to 37° C. and the polymer was recovered. The product amounted to 42.2 g. of a copolymer containing approximately 50 percent polybutadiene and 50 percent polyisoprene.

Example 11

A catalyst composition consisting of 0.0202 g. of cerous 5-cyclohexylsalicylaldehyde chloride, produced by reacting cerous chloride with 5-cyclohexylsalicylaldehyde, and 0.3 ml. of triisobutyl aluminum was allowed to stand at 20–25° C. in a sealed tube for about 2 hours. Then about 25 ml. of butadiene was added and the tube was resealed. After warming to about 20° C., the contents of the tube were allowed to react for 1.25 hours. The reaction was then quenched and the polymer was freed of catalyst and dried. The polymer was a rubbery solid whose infrared spectrum indicated about 93 percent cis-1,4, 5 percent trans-1,4 and 2 percent 1,2-polybutadiene content. The yield was 5.8 g.

Example 12

A catalyst composition consisting of 0.0700 g. of Ce(cyclohexylsalicylaldehyde)$_x$ Cl$_{3-x}$ 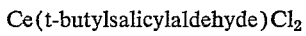 and 5 ml. of triisobutyl aluminum was mixed and allowed to stand at 20–25° C. in a small glass tube kept in a nitrogen atmosphere for about 2.6 hours. The tube and its contents were then introduced into a polymerization bottle containing about 200 ml. of liquid butadiene at Dry Ice temperature and the bottle was sealed by means of a cap. The bottle and its contents were then rapidly warmed to approximately room temperature by shaking to disperse the catalyst composition. Within 9 minutes the mixture was very viscous and bubbles were being generated throughout the sample because of the heat of reaction. After about 13 minutes the reaction bottle was cooled under cold water to prevent build-up of excessive pressure. Intermittent cooling was continued for about an hour, after which time the rate of heat evolution was no longer sufficient to rapidly increase the temperature. The reaction flask was opened 43 hours after the reaction was initiated and 128.5 g. of dried polymer, analyzing by infrared as 94 percent cis-1,4-polybutadiene, 4 percent trans-1,4-polybutadiene and 2 percent 1,2-polybutadiene, was recovered.

Example 13

A catalyst composition was prepared by mixing 0.0505 g. of Ce(cyclohexylsalicylaldehyde)$_x$ Cl$_{3-x}$ and 1.948 g. of triisobutyl aluminum in a septum capped serum vial. After two hours, 4.445 g. of a mixture containing 4.309 g. of benzene and 0.456 g. of triisobutyl aluminum was added and the solution was allowed to stand in the vial at 20–25° C. for about 16 hours. The catalyst mixture was then taken up in a syringe and 6 g. was put into a stainless steel bomb which had previously been charged with 78 g. of butadiene at Dry Ice temperature. The mixture was allowed to warm autogenously from about 10° C. to 35° C. in 20 minutes and the temperature was then quickly raised to 98° C. by steam heating the exterior of the bomb. The temperature was maintained at 98° C. for two hours, the reaction was then quenched by cooling the bomb in Dry Ice and the polymer produced was freed of catalyst and dried. The quantity of dry polymer collected amounted to 36.4 g. with a molecular weight of 0.35×10⁶. It analyzed by infrared as 92 percent cis-1,4-polybutadiene, 4 percent trans-1,4-polybutadiene and 4 percent 1,2-polybutadiene.

Example 14

The co-catalyst cerous 2-hydroxyquinolinato chloride was prepared by mixing 0.01 mole of cerous chloride (2.46 g.) and 0.02 mole of 2-hydroxyquinoline (2.90 g.) in 18 ml. of ethanol and refluxing the mixture for about 7 hours. The cerous 2-hydroxyquinolinato chloride produced was dried under vacuum to a temperature of 120° C. A catalyst complex was then prepared by admixing 0.10 gram of the dried cerous 2-hydroxyquinolinato chloride and 1.0 ml. of triisobutylaluminum and allowing the mixture to stand for about 17 hours in a sealed tube at 25° C. About 25 ml. of liquid butadiene was then added and the tube was resealed and warmed to room temperature. Reaction commenced immediately upon warming as evidenced by bubbling and heat evolution. Within 4 minutes the contents of the tube were too viscous to flow. The tube was cooled under tap water to moderate the reaction and after 30 minutes reaction time the polymer that had formed was removed, coagulated, washed and dried. The dried polymer weighed 12.7 grams and analyzed by infrared as 90 percent cis-1,4-polybutadiene, 4 percent trans-1,4-polybutadiene and 6 percent 1,2-polybutadiene.

Example 15

One tenth of a gram of the co-catalyst cerous 8-hydroxyquinolinato chloride, obtained by reacting 8-hydroxyquinoline and cerous chloride in ethanol, was added to 1.0 ml. of triisobutylaluminum in a polymerization tube and the mixture was allowed to stand for 2 hours and 45 minutes at about 25° C. Then 25 ml. of butadiene was added at Dry Ice temperature and the mixture was warmed to room temperature. Polymerization began at once. After 18 minutes the reaction was quenched by cooling the tube in Dry Ice and the polymer was coagulated, washed and dried. The quantity of polybutadiene recovered was 6.6 g. and it analyzed by infrared as 90 percent cis-1,4-form, 7 percent trans-1,4-form and 3-percent 1,2-form.

Example 16

A small quantity, 0.101 grams, of the co-catalyst cerous 2-acetylphenolato chloride, prepared by reacting one to one molar ratios of 2'-hydroxyacetophenone and cerous chloride in ethanol and then evaporating to dryness, was added to 1.0 ml. of triisobutyl aluminum and the mixture was allowed to stand for 18 hours at about 25° C. Then 25 ml. of butadiene was added to the mixture and polymerization was carried out at about 20° C. and after five days 17.8 g. of solid, rubbery polymer was isolated. The composition of the polymer by infrared analysis was 95 percent cis-1,4-polybutadiene, 4 percent trans-1,4-polybutadiene and 1 percent 1,2-polybutadiene.

Example 17

A polymerization catalyst was produced by allowing 0.100 g. of cerous o-aminophenolato chloride, formed by reacting o-aminophenol and cerous chloride, to stand with 1 ml. of triisobutyl aluminum for about 23 hours at 20–25° C. At the end of this period 25 ml. of liquid butadiene was added to the catalyst composition and the mixture was allowed to stand in a sealed tube at room temperature for about 24 hours. A quantity of rubbery polymer weighing 4.1 g. was isolated. The infrared spectrum of the material revealed that the microstructure of the polymer had 93 percent cis, 5 percent trans and 2 percent 1,2-polybutadiene linkages.

Example 18

Approximately 0.02 millimoles of cerium tris (8-hydroxyquinolinate) and 0.02 millimoles of diisobutylaluminum chloride in about 1 ml. of benzene were treated with 0.25 ml. of triisobutyl aluminum and allowed to stand under a nitrogen atmosphere in a polymerization tube at 20–25° C. for about 30 minutes to 1 hour until most of the cerium compound had gone into solution. The above-described catalyst complex was then frozen at Dry Ice temperature and about 25 ml. of liquid butadiene was added. The tube was then sealed and warmed to room temperature and the contents shaken to provide mixing of catalyst and monomer. Polymerization commenced at about 0° C. and the heat of reaction warmed the tube so that it felt warm to the touch. In 7½ minutes the contents of the tube were so viscous that inversion produced no visible flow of the contents. The reaction was quenched by rapidly cooling the polymerization tube to Dry Ice temperature and after workup of the product 4.3 g. of a rubbery, tacky polymer was recovered. The polymer was analyzed by infrared analysis and found to consist of 96 percent cis-1,4-polybutadiene, 3 percent trans-1,4-polybutadiene and 1 percent 1,2-polybutadiene.

Example 19

A polymerization catalyst was prepared by mixing 0.02 millimoles of lanthanum tris (8-hydroxyquinolinate) with 0.02 millimoles of diisobutylaluminum chloride in 1 ml. of benzene and treating the mixture with 0.25 ml. of triisobutylaluminum. The above-described catalyst was allowed to stand at 25° C. in a polymerization tube for about one hour and was then cooled to Dry Ice temperature and about 25 ml. of liquid butadiene was added. The tube was sealed and warmed to room temperature. A total of 1.39 g. of polymer was produced in about 1½ hours. The polymer consisted of 89 percent cis-1,4-polybutadiene, 7 percent trans-1,4-polybutadiene and 4 percent 1,2-polybutadiene as determined by infrared analysis.

Example 20

Cerium metal was treated to remove the inert oxide coating from its surface by immersion in fused mercuric chloride and the amalgam coated metal thus produced was washed with ethanol and then with benzene. Twenty ml. of benzene and 15.0 grams of 2-ethylhexanoic acid were then added to 20 grams of the cerium metal in a small flask equipped with a reflux condenser and the mixture was allowed to reflux for about 40 hours. Approximately 50 ml. of benzene was then added and the solution was filtered while still hot. The benzene was distilled off under vacuum and the solid product, cerium tris(2-ethylhexanoate), was dried at 150° C. and a pressure of 0.3 mm. of mercury. Fourteen grams of cerium tris(2-ethylhexanoate) was recovered.

A catalyst composition was prepared by admixing 0.02 millimoles (0.0114 g.) of the cerium tris(2-ethylhexanoate), 1.0 ml. of a 0.02 molar solution of diisobutylaluminum bromide in benzene and 0.25 ml. of triisobutylaluminum in a polymerization tube at 20 to 25° C. under an atmosphere of nitrogen. The tube was then sealed and the mixture allowed to stand for about 1 hour. At the end of this time, most of the solid material had gone into solution and only small amounts of a light flocculent precipitate remained. The tube was then opened, immersed in a Dry Ice bath, and about 25 ml. of liquid butadiene was collected in the tube over the catalyst. The tube was then resealed and warmed to about 15° C. to start the polymerization. Reaction commenced immediately and after about four minutes of reaction, during which time the temperature rose so that the tube was warm to the touch, the material in the tube was essentially solid and the reaction was quenched by immersion in a Dry Ice-acetone bath. The contents of the tube were then emptied into a solution of hydrochloric acid and methanol to terminate the polymerization reaction. Work-up of the polymer yielded 2.61 g. of a solid, rubber-like material which according to infrared analysis contained 93 percent cis-1,4-polybutadiene, 5 percent trans-1,4-polybutadiene and 2 percent 1,2-polybutadiene.

Example 21

A catalyst composition was prepared by admixing 0.0113 g. of cerium tris(2-ethylhexanoate), 0.20 ml. of benzene containing 0.16 milliequivalents of diisobutylaluminum iodide per milliliter, and 0.25 ml. of triisobutylaluminum in a polymerization tube. After standing for 1 hour at about 50° C. the mixture was cooled to Dry Ice temperature and 25 ml. of butadiene was added. Upon warming the mixture to room temperature polymerization began with a resultant increase in the temperature and viscosity of the mixture. After 4 minutes, the reaction was quenched by immersing the tube in a Dry Ice-actone bath, the catalyst was deactivated by addition of HCl and methanol and 3.39 g. of polymer was recovered. According to infrared analysis the polymer contained 96.8 percent cis-1,4-polybutadiene, 1.6 percent trans-1,4-polybutadiene and 1.6 percent 1,2-polybutadiene.

Example 22

A solution of 0.1 mole of $H_2CeCl_6$ in 150 ml. of ethanol was prepared by addition at autogenous temperature of dry hydrogen chloride to a mixture of 0.1 mole of fresh $Ce(OH)_4$ in absolute ethanol. Anhydrous oxalic acid (0.2 mole) was added to the $H_2CeCl_6$ solution and a precipitate formed slowly as the hydrogen chloride produced during the reaction was removed in a nitrogen purge while refluxing the solution. The precipitate, cerous chloride oxalate, was collected in a centrifuge tube, washed with ethanol and vacuum dried. The dried cerous chloride oxalate was activated by heating for about 45 minutes at 300° C. Analysis of the precipitate indicated that the active cerous chloride oxalate had an elemental composition of $C_{1.75}Ce_{1.00}Cl_{1.22}H_{3.02}O_{4.73}$.

A catalyst composition was prepared by adding 3 ml. of triisobutylaluminum to 0.093 g. of the above-described cerous chloride oxalate compound at 27° C. in a clean, dry polymerization flask. Polymerization grade butadiene-1,3 that had been subjected to vapor phase purification by passage through an adsorbent bed was collected over the catalyst at Dry Ice temperature. Essentially no polymerization occurred at this temperature. A total of 25 ml. of butadiene-1,3 was added to the catalyst composition, and the flask was sealed. As the flask warmed, due to exposure to the ambient air, the polymerization reaction commenced and many fine particles of polymer could be seen before the temperature of the mixture reached 0° C. The mixture was agitated overnight at 30° C. and at the end of this reaction period the polymerization was terminated by cooling the flask in Dry Ice, venting, and then discharging the polymer into a mixture of isopropanol and hydrochloric acid. The polymer was separated from the isopropanolhydrochloric acid mixture, granulated, washed with water, washed in isopropanol and then dried in a vacuum oven at about 50° C. A yield of 9.3 g. of colorless polybutadiene, which by infrared analysis was found to be 98 percent cis-1,4- form and 2 percent 1,2-form, was obtained.

It was found that if the cerous chloride oxalate component of the catalyst complex was not subjected to a heat treatment, as hereinbefore described, then the catalyst complex was inactive and gave essentially no yield of polybutadiene.

Example 23

A catalyst composition was prepared from 1.0 ml. of triisobutylaluminum and 0.44 g. of the cerous chloride oxalate compound prepared as described in Example 22 above. Then 25 ml. of butadiene-1,3 was added to the catalyst in a polymerization flask and the mixture was shaken for one hour at room temperature, giving a yield of 10.9 g. of polybutadiene.

Example 24

An equimolar mixture of 18 grams of anhydrous oxalic acid and 29 grams of diethyl oxalate was heated for 3 hours at 130° C., whereby these materials were converted to ethyl hydrogen oxalate. Cerous chloride (0.17 mole) dissolved in 200 ml. of ethanol was added immediately to 0.20 mole of the hot ethyl hydrogen oxalate. The mixture was then evaporated to dryness under a partial vacuum (pressure of 50 mm. Hg absolute) in a rotating 250 ml. flask, which was partially immersed in a 120° C. bath and had a 250 watt infrared lamp directed on it from above. The small quantity of precipitate which formed as the cerous chloride and ethyl hydrogen oxalate were first mixed went into solution and then a precipitate formed as the evaporation continued. When this precipitate, cerous chloride oxalate, was sufficiently dry it was broken and allowed to roll in the flask. Microscopic examination indicated that the cerous chloride oxalate consisted of agglomerates of very small particles, ranging in size from about 1 to 10 microns.

A catalyst composition was prepared by adding 0.027 g. of the above-described cerous chloride oxalate to 0.1 ml. of triisobutylaluminum and allowing the mixture to stand at about 27° C. for 23 hours. Then 25 ml. of butadiene-1,3 was added to the catalyst at Dry Ice temperature and the mixture was agitated for 30 minutes in a 30° C. bath. The yield was four grams of polybutadiene with a molecular weight of $0.96 \times 10^6$; indicating a reaction rate of 185 grams per gram of catalyst complex per hour and a productivity of 80 grams of polybutadiene per gram of catalyst complex.

Repeated preparations indicated that if the infrared lamp was not used the oxalate component had to be activated by about a 45 minute heat treatment at about 300° C.

Example 25

A catalyst composition was prepared by adding 0.027 g. of the cerous chloride oxalate co-catalyst described in Example 24 above to 0.5 ml. of triisobutylaluminum and allowing the mixture to stand at about 27° C. for 18 hours. The liquid portion, 0.4 ml., was removed and 25 ml. of butadiene-1,3 was added to the residue. After four hours of shaking in a 30° C. bath, 8.9 g. of polybutadiene with a molecular weight of $0.34 \times 10^6$ were obtained. The productivity was 90 grams of polymer per gram of catalyst complex.

Example 26

A catalyst composition was prepared by adding 0.055 g. of the cerous chloride oxalate co-catalyst described in Example 24 to 1.0 ml. of triisobutylaluminum and allowing the mixture to stand in a tube at about 27° C. for 24 hours. The liquid portion, 0.9 ml. was removed and 24 ml. of butadiene-1,3 was added to the residue. The tube was sealed and shaken in a 30° C. bath. After 15 minutes, 3.3 g. of polybutadiene were obtained.

Example 27

A catalyst composition was prepared by adding 0.11 g. of the cerous chloride oxalate co-catalyst described in Example 24 to 2.0 ml. of triisobutylaluminum in a polymerization tube and allowing the mixture to stand for 24 hours at about 27° C. The liquid portion, 1.9 ml., was removed and 25 ml. of butadiene-1,3 was added to the residue. The tube was sealed and shaken at room temperature for 15 minutes. The yield was 7.9 g. of polybutadiene which was 98 percent cis-1,4 form and 2 percent 1,2 form.

In a similar manner, butadiene is polymerized by substitution of triethylaluminum or trihexylaluminum or tridodecylaluminum for the triisobutylaluminum.

Example 28

A quantity (0.11 g.) of the cerous chloride oxalate co-catalyst described in Example 24 was allowed to stand in tube A with 2.0 ml. of triisobutylaluminum for a period of about 60 hours at about 27° C. The liquid portion of the mixture, 1.8 ml., was transferred to tube B and 25 ml. of butadiene-1,3 was added to each tube. Both tubes were sealed and placed in a shaker in a 30° C. bath. After seven minutes, 8.1 grams of polybutadiene were obtained from tube A indicating a polymerization rate of 260 grams of polymer per gram of catalyst complex per hour. Little polymer was found in tube B after 24 hours and it was discarded.

*Example 29*

A quantity (0.44 g.) of the cerous chloride oxalate co-catalyst described in Example 24 was placed in a polymerization tube. After addition of 0.5 ml. of triisobutylaluminum, the tube was cooled in Dry Ice and 25 ml. of butadiene-1,3 was added. The tube was sealed and shaken in a 30° C. bath for about four minutes. The yield of polybutadiene was 14 grams, which represented a polymerization rate of 240 grams of polymer per gram of catalyst complex per hour. The polybutadiene was found to be 97 percent cis-1,4 and 3 percent 1,2-forms.

*Example 30*

A quantity (0.44 g.) of the cerous chloride oxalate co-catalyst described in Example 24 was placed in a polymerization tube. After addition of 2 ml. of triisobutylaluminum the tube was cooled in Dry Ice and 25 ml. of butadiene-1,3 was added. The tube was sealed and shaken at 27° C. for 11 minutes. The yield of polybutadiene was 18 grams which represented about 95 percent utilization of the butadiene monomer.

*Example 31*

A quantity (0.25 g.) of the cerous chloride oxalate co-catalyst described in Example 24 was allowed to stand in a flask at about 27° C. with 2.0 ml. of triisobutylaluminum. The liquid portion (1.6 ml.) was removed and 250 ml. of butadiene-1,3 was added to the residue. The flask was sealed and shaken at room temperature for 35 minutes. The yield of polybutadiene was 56 grams. This represents a productivity of 95 grams of polymer per gram of catalyst complex and a polymerization rate of 160 grams of polymer per gram of catalyst complex per hour.

*Example 32*

A mixture of 2.18 g. of cerous oxalate and 1 ml. of concentrated hydrochloric acid at room temperature was sealed in a Pyrex tube. The heat of reaction raised the temperature to 129° C. The tube was heated from 129° C. to 165° C. over a period of 2.7 hours, then cooled to room temperature and allowed to stand overnight. After opening the tube, the solid product was removed, dried under vacuum at 120° C. and then subjected to a heat treatment at 300° C. for 45 minutes. The elemental composition of the cerous chloride oxalate produced was $C_{1.70}Ce_{1.00}Cl_{1.15}H_{2.38}O_{3.83}$.

A catalyst composition was prepared by adding 2 ml. of triisobutylaluminum to 0.11 g. of the above-described cerous chloride oxalate compound. Then 25 ml. of butadiene-1,3 was added to the catalyst in a polymerization flask and the mixture was allowed to stand overnight at 25° C. A yield of 12 g. of polybutadiene was obtained.

In a similar manner butadiene is polymerized by substitution of diisobutylaluminum hydride for the triisobutylaluminum.

*Example 33*

A mixture of 4.35 g. of cerous oxalate and 2.7 ml. of concentrated hydrobromic acid was sealed in a Pyrex tube and heated at 150–160° C. for about 2 hours. After allowing the tube to stand overnight at room temperature the solid product was removed and dried under a partial vacuum (pressure of 200 mm. Hg absolute) at 120° C. This solid material, cerous bromide oxalate, was then heated for 1 hour at 300° C. while exposed to the atmosphere.

A catalyst composition was prepared by adding 2 ml. of triisobutylaluminum to 0.11 g. of the above-described cerous bromide oxalate compound. Then 25 ml. of butadiene-1,3 was added to the catalyst in a flask which was sealed and maintained at a temperature of 30° C. After about 16 hours the polymerization reaction had resulted in a yield of 12 g. of polybutadiene.

*Example 34*

A catalyst composition was prepared in a clean, dry polymerization flask by adding 2 ml. of trisobutylaluminum to 0.11 g. of the cerous bromide oxalate produced in Example 33 above. Then 25 ml. of butadiene-1,3 was added to the catalyst. After eight days at room temperature, the yield of polybutadiene obtained was 14 g.

*Example 35*

A catalyst composition was prepared by admixing 0.012 g. of dysprosium tris(2-ethylhexanoate), prepared by refluxing dysprosium oxide with 2-ethylhexanoic acid, with 0.5 ml. of a heptane solution containing 0.04 millimoles of diisobutylaluminum bromide and 0.25 ml. of triisobutylaluminum. The catalyst composition was added to 25 ml. of liquid butadiene contained in a polymerization tube and after two days at room temperature the polymer which had formed was removed. A total of 0.47 g. of polymer which according to infrared analysis contained about 70 percent cis-1,4-polybutadiene, 22 percent trans-1,4-polybutadiene, and 8 percent 1,2-polybutadiene was obtained.

The foregoing examples clearly demonstrate the effectiveness of the novel catalyst compositions of this invention in polymerizing 1,3-dienes to high molecular weight polymers having a high proportion of cis-1,4 structure. It is to be noted that the polymerization processes of this invention are equally applicable to batchwise operation or to continuous operation by the simultaneous and continuous introduction of the catalyst composition and the monomer to reactors known to be suitable for such purposes.

Various changes and modifications can be made in practicing the present invention without departing from it and therefore it is intended to include in the scope of the appended claims all such modifications and variations as may be apparent to those skilled in the art from the description and illustrative examples given herein.

We claim:

1. A process for polymerizing 1,3-dienes of the formula:

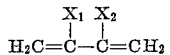

wherein $X_1$ and $X_2$ are independently selected from the group consisting of hydrogen and alkyl of 1 to about 10 carbon atoms, to produce polydienes having a high proportion of cis-1,4-structure, which process comprises contacting said 1,3-dienes with a catalyst composition selected from the group consisting of (1) the reaction product of (a) a metal chelato halide selected from the group consisting of compounds of the formulae $ML_2X$ and $MLX_2$, and mixtures thereof, and (b) a member selected from the group consisting of aluminum trialkyls and alkylaluminum hydrides having from 1 to about 15 carbon atoms in each alkyl group thereof, and (2) the reaction product of (a) a soluble metal chelate of the formula $ML_3$, (b) an alkylaluminum halide having from 1 to about 15 carbon atoms in each alkyl group thereof, and (c) a member selected from the group consisting of aluminum trialkyls and alkylaluminum hydrides having from 1 to about 15 carbon atoms in each alkyl group thereof; wherein M is a trivalent Group III–B metal ion having an atomic number of from 21 to 71, L is a chelating bidentate organic ligand containing up to about 20 carbon atoms and having functional groups which are separated by up to 5 carbon atoms and which are selected from the class consisting of tertiary nitrogen, formyl, carbonyl, oxy, alkoxy, alkoxycarbonyl, amino, alkimino and hydroxyl, and X is a halide ion; the molar ratio of said halide ion to said Group III–B metal ion in said catalyst composition being from about 0.1:1 to about 10:1, and the molar ratio of aluminum to said Group III–B metal ion in said catalyst composition being from about 1:1 to about 400:1.

2. The process as claimed in claim 1, wherein the 1,3-diene is butadiene-1,3.

3. The process as claimed in claim 1, wherein the 1,3-diene is isoprene.

4. The process as claimed in claim 1, wherein the trivalent Group III–B metal ion is $Ce^{+++}$.

5. The process as claimed in claim 1, wherein the trivalent Group III–B metal ion is $La^{+++}$.

6. The process as claimed in claim 1, wherein said metal chelato halide is a chloride.

7. The process as claimed in claim 1, wherein said metal chelato halide is a bromide.

8. The process as claimed in claim 1, wherein said metal chelato halide is an iodide.

9. The process as claimed in claim 1, wherein the member selected from the group consisting of aluminum trialkyls and alkylaluminum hydrides is triisobutylaluminum.

10. The process as claimed in claim 1, wherein the molar ratio of said halide ion to said Group III–B metal ion in said catalyst composition is from about 0.5:1 to about 2.5:1.

11. The process as claimed in claim 1, wherein the molar ratio of said halide ion to said Group III–B metal ion in said catalyst composition is about 1:1.

12. The process as claimed in claim 1, wherein the molar ratio of aluminum to said Group III–B metal ion in said catalyst composition is from about 25:1 to about 100:1.

13. The process as claimed in claim 1, wherein the 1,3-diene is butadiene-1,3 and the molar ratio of said halide ion to said Group III–B metal ion in said catalyst composition is from about 0.5:1 to about 2.5:1.

14. The process as claimed in claim 1, wherein the 1,3-diene is isoprene and the molar ratio of said halide ion to said Group III–B metal ion in said catalyst composition is from about 0.5:1 to about 2.5:1.

15. The process as claimed in claim 1, wherein the 1,3-diene is a mixture of butadiene-1,3 and isoprene and the molar ratio of said halide ion to said Group III–B metal ion in said catalyst composition is from about 0.5:1 to about 2.5:1.

References Cited by the Examiner

UNITED STATES PATENTS

| | | | |
|---|---|---|---|
| 3,051,690 | 8/1962 | Vandenberg | 260—94.3 |
| 3,094,514 | 6/1963 | Tucker | 260—94.3 |
| 3,182,051 | 5/1965 | Marullo | 260—94.3 |

FOREIGN PATENTS

| | | |
|---|---|---|
| 213,051 | 1/1961 | Austria. |
| 865,248 | 4/1961 | Great Britain. |
| 1,281,516 | 12/1961 | France. |

OTHER REFERENCES

Gippin: ACS Preprints, vol. 6, No. 4, September 1961, pp. A–25 to A–42.

JOSEPH L. SCHOFER, *Primary Examiner.*

JAMES A. SEIDLECK, E. J. SMITH,
*Assistant Examiners.*